United States Patent
Heilig

[11] Patent Number: 6,161,864
[45] Date of Patent: Dec. 19, 2000

[54] GAS BAG MODULE FOR A VEHICLE OCCUPANT RESTRAINT SYSTEM

[75] Inventor: Alexander Heilig, Wissgoldingen, Germany

[73] Assignee: TRW Occupant Restraint Systems GmbH & Co. KG, Alfdorf, Germany

[21] Appl. No.: 09/206,893

[22] Filed: Dec. 8, 1998

[30] Foreign Application Priority Data

Dec. 8, 1997 [DE] Germany .......................... 297 21 644

[51] Int. Cl.[7] .................................................. B60R 21/16
[52] U.S. Cl. ................................... 280/728.2; 280/728.3; 280/732; 280/743.1
[58] Field of Search .............................. 280/743.1, 728.2, 280/728.3, 731, 732, 728.1, 743.2

[56] References Cited

U.S. PATENT DOCUMENTS

| | | | |
|---|---|---|---|
| 5,342,085 | 8/1994 | Hirashima et al. ................. | 280/728.3 |
| 5,344,184 | 9/1994 | Keeler et al. . | |
| 5,431,433 | 7/1995 | Steimke et al. . | |
| 5,662,355 | 9/1997 | Byon . | |
| 5,791,683 | 8/1998 | Shibata et al. .......................... | 280/732 |
| 5,901,976 | 5/1999 | Kreuzer et al. ..................... | 280/728.3 |
| 5,941,558 | 8/1999 | Labrie et al. ........................ | 280/728.3 |

FOREIGN PATENT DOCUMENTS

| | | | |
|---|---|---|---|
| 0811532 | 10/1997 | European Pat. Off. . | |
| 4217173 | 11/1993 | Germany ............................ | 280/728.3 |

*Primary Examiner*—Brian L. Johnson
*Assistant Examiner*—Bryan Fischmann
*Attorney, Agent, or Firm*—Tarolli, Sundheim, Covell, Tummino & Szabo L.L.P.

[57] ABSTRACT

A gas bag module of a vehicle occupant restraint system comprises a housing, a gas bag arranged therein, a gas generator for filling the gas bag with compressed gas, and a cover which in a closed position closes the housing and can be brought into an opened position after activation of the gas generator so that the gas bag can emerge from the housing. The cover is coupled to a support element which is spatially separate from the cover. The support element, after activation of the gas generator, is exposed to a force resulting from the compressed gas produced by the gas generator and biases the cover into the opened position.

33 Claims, 20 Drawing Sheets

GAS BAG MODULE FOR A VEHICLE OCCUPANT RESTRAINT SYSTEM

FIELD OF THE INVENTION

The invention relates to a gas bag module for a vehicle occupant restraint system.

BACKGROUND OF THE INVENTION

Such gas bag module comprises a housing, a gas bag arranged therein, a gas generator for filling the gas bag with compressed gas and a cover which closes the housing with respect to the interior of the vehicle and is opened after activation of the gas generator, in order to enable the gas bag to emerge from the housing.

In conventional gas bag modules, after activation of the gas generator, the cover is opened by the force which the gas bag, acted upon by the compressed gas and unfolding, exerts onto the cover. As the cover of the gas bag module in the normal operation of the vehicle is to be not visible, as far as possible, usually a continuous material layer is constructed on that face of the cover which is visible from the interior of the vehicle, which material layer is provided with predetermined breaking points. To open the cover, firstly the continuous material layer has to be overcome. The result of this is that after activation of the gas generator, only a comparatively high pressure has to build up inside the gas bag, before the continuous material layer yields and the cover can open so that the gas bag can unfold inside the vehicle. This pressure, which is reached before the cover is opened, is very much higher than the pressure which occurs during the following unfolding process of the gas bag, in its interior. This excessively high pressure before the start of the opening process of the cover has proved to be disadvantageous from many points of view. From the high pressure, high contact forces result between the gas bag and the cover, for which reason special precautions have to be taken that the gas bag, tearing open the cover, is not damaged by the cover. In addition, the initially excessively high pressure is disadvantageous for the manner in which the gas bag unfolds and positions itself inside the vehicle.

BRIEF DESCRIPTION OF THE INVENTION

The invention provides a gas bag module in which after the ignition of the gas generator and before the opening process of the cover, no excessively high pressure is built up in the gas bag. A gas bag module of a vehicle occupant restraint system in accordance with the invention comprises a housing, a gas bag arranged therein, a gas generator for filling the gas bag with compressed gas, and a cover which in a closed position closes the housing and can be brought into an opened position after activation of the gas generator so that the gas bag can emerge from the housing. The cover is coupled to a support element which is spatially separate from the cover. The support element, after activation of the gas generator, is exposed to a force resulting from the compressed gas produced by the gas generator and biases the cover into the opened position. With this construction, the cover is opened by means of the additionally provided support element; this element can be arranged at any desired suitable location in the gas bag module where the necessary space is available and which leads to better leverage on opening.

Preferably, provision is made that the cover is swivellably mounted on the housing by means of a swivel plate about a swivel axis extending in the longitudinal direction of the module. The opening of the cover is in fact facilitated when it is not coupled with the housing by means of one of its longitudinal edges and consequently swivels around it, but rather is connected with the housing by means of an additionally provided component. In this way, in fact, the radius about which the cover swivels on opening can be increased, which has an advantageous effect on the forces necessary for opening the cover owing to the longer lever arm which is available. In addition, a more advantageous path of motion of the cover can be achieved.

Preferably, provision is additionally made that the support element is mounted on the swivel plate. Alternatively, provision can be made that the support element is part of the swivel plate. The force resulting from the compressed gas produced by the gas generator and acting on the support element can in this way be introduced directly into the swivel plate with which the cover is also connected, so that the cover is opened without force losses.

Preferably, provision is additionally made that the swivel plate is mounted outside the housing and the support element projects into the housing through an opening in the wall of the housing. In this way, a particularly compact construction of the gas bag module is produced and the force acting on the support element after activation of the gas generator results from the difference between the pressure prevailing inside the housing and the pressure prevailing outside the housing.

Preferably, in addition, a barrier is provided between the gas generator and the gas bag, which barrier immediately after activation of the gas generator prevents an entry of the compressed gas, produced therefrom, into the gas bag. In this way, it is ensured that after activation of the gas generator, the gas bag initially is not acted upon at all by the produced compressed gas, apart from small leakage flows through the barrier. The compressed gas is therefore initially entirely only used to open the cover. At the moment of opening of the cover, the gas bag is still completely or at least almost pressure free, so that the above-mentioned problems with prior art gas bag modules do not occur, in which modules the gas bag, being under high pressure, rests against the still closed or just opening cover. Only after the cover of the gas bag module according to the invention is opened completely or to a substantial extent, the barrier is overcome and the gas bag is filled with compressed gas.

Preferably, provision is additionally made that as part of the barrier, a dividing wall arranged between the gas generator and the gas bag is used, which wall is provided with at least one passage opening, and that in the initial state the passage opening is closed with the cover being closed and in the activated state is exposed with the cover being open. In addition to its function as part of the cover, this dividing wall can also be used to reinforce the housing. It is also possible to use a frame piece as dividing wall, which in many gas generators is inserted into the upper part of the housing and serves to fasten the gas bag to the housing.

As part of the barrier, in addition for example a slider element, a bursting membrane or a fabric piece can be provided, each of which in the initial state, i.e. shortly after activation of the gas generator, prevents a flow of compressed gas from the gas generator into the gas bag. The slider element and the bursting membrane are preferably constructed in direct contact with the dividing wall, whereas the fabric piece can be used spaced apart from the dividing wall.

Preferably, in addition provision is made that the swivel axis is arranged in the region of the base of the housing. It is advantageous, in addition, if the swivel axis is arranged in the central longitudinal plane of the housing. With this construction, a particularly advantageous path of motion of the cover results, because on opening, this cover dips away outwards and downwards, i.e. disappears under the regions surrounding it, for example of an instrument panel. In contrast to the covers known from the prior art, which open in the direction of the vehicle occupant, there is not risk for the vehicle occupant to get hit by the cover.

Finally, provision is preferably made that the support element is arranged such that it is exposed to the force resulting from the compressed gas produced by the gas generator along a direction which is at least approximately parallel to the direction of extent of the cover in the closed state. In this way, the force resulting from the compressed gas is converted optimally into the opening movement of the cover. This represents a substantial difference from the prior art, in which the cover, when it is to be opened, is usually acted upon by a force which acts perpendicularly to the cover, at least at the start of the opening movement.

Advantageous developments of the invention will be apparent from the sub-claims.

BRIEF DESCRIPTION OF THE DRAWINGS

The invention is described hereinbelow with the aid of preferred embodiments, which are illustrated in the attached drawings. In these.

DETAILED DESCRIPTION OF THE INVENTION

Figure 1:
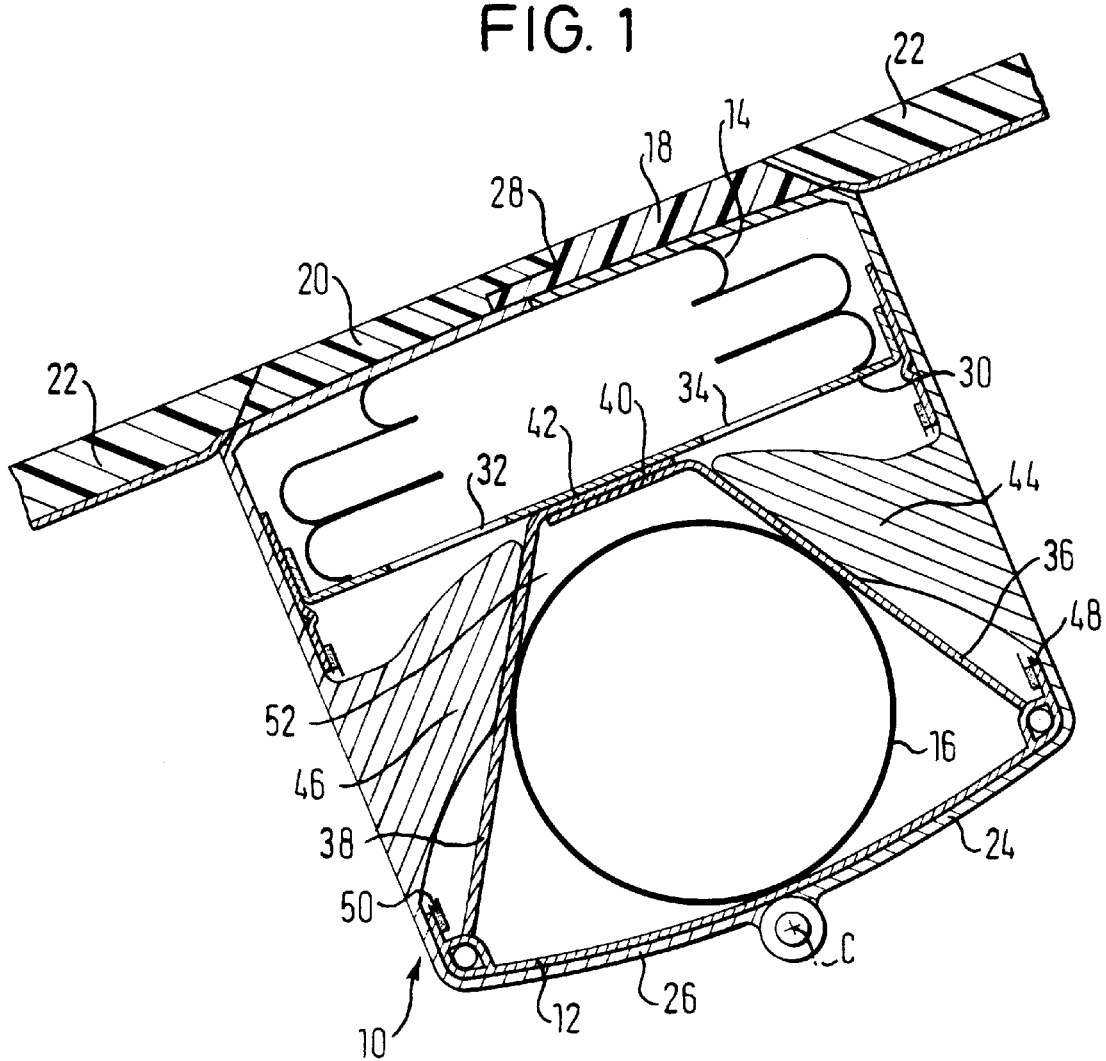
FIG. 1 shows a cross-sectional view of a gas bag module according to the invention, in accordance with a first embodiment, in the state of rest.

In FIG. 1, a gas bag module 10 according to a first embodiment of the invention is illustrated in a cross-sectional view. The gas bag module consists generally of a housing 12, a gas bag 14 arranged therein, a gas generator 16 to fill the gas bag 14 with compressed gas and a cover which consists of two components 18, 20 and covers the gas bag 14. The gas bag module 10 is arranged in a vehicle in such a way that the cover 18, 20 is flush with an instrument panel 22, for example. The gas bag 14 can be unfolded by means of the compressed gas, provided by the gas generator 16 after its activation, such that the gas bag 14 positions itself inside the vehicle and provides a restraining effect for a vehicle occupant.

The components 18, 20 of the cover are each swivellably articulated on the housing 12 by means of a swivel plate 24, 26, the swivel axis C in the central longitudinal plane of the gas bag module extending parallel to its longitudinal axis along the base of the housing. Each swivel plate 24, 26 has a U-shaped section and extends, starting from the swivel axis C, along the base of the housing 12 on its outer face outwards to the lower longitudinal edge of the housing, starting from there along the side wall of the housing upwards and then along the underside of the corresponding component 18, 20 of the cover towards the central longitudinal plane of the gas bag module. The corresponding component 18, 20 of the cover is firmly connected with the portion of the swivel plate 24, 26 extending on the upper face of the housing. The two components 18, 20 of the cover lie adjacent to each other in the region of the central longitudinal plane of the gas bag module, a step-like contact section 28 being provided.

Inside the housing, between the region in which the gas generator 16 is arranged and the region in which the folded gas bag 14 is arranged, a dividing wall 30 is arranged. This dividing wall is connected with the side walls of the housing and can be used to mount the gas bag 14 on the housing 12. The dividing wall 30 is provided with two passage openings 32, 34, which lead to the interior of the gas bag 14.

Slider plates 36, 38 are swivellably mounted on the base of the housing 12 along the side edges. These slider plates extend in the state of rest obliquely inside the housing past the gas generator 16 towards the dividing wall 30, a slider element 40, 42 being provided at that end of each slider plate 36, 38 facing away from the base of the housing 12, which slider element 40, 42 is constructed in the manner of a plate and has such an angle with the corresponding slider plate 36, 38 that it extends parallel to the dividing wall 30. The base of the housing 12, the slider plates 36, 38 and the slider elements 40, 42 form together with the end faces of the housing a working chamber which is closed in the state of rest and in which the gas generator 16 is arranged.

On the face of each slider plate 36, 38 facing away from the gas generator 16, a support element 44, 46 lies, which is constructed as a projection formed in one piece with the corresponding swivel plate 24, 26. Each support element extends from the outer face of the housing, on which the swivel plates 24, 26 are arranged, into the interior of the housing in contact with the slider plates 36, 38 through openings 48, 50, which are constructed in the side walls of the housing.

Figure 2:
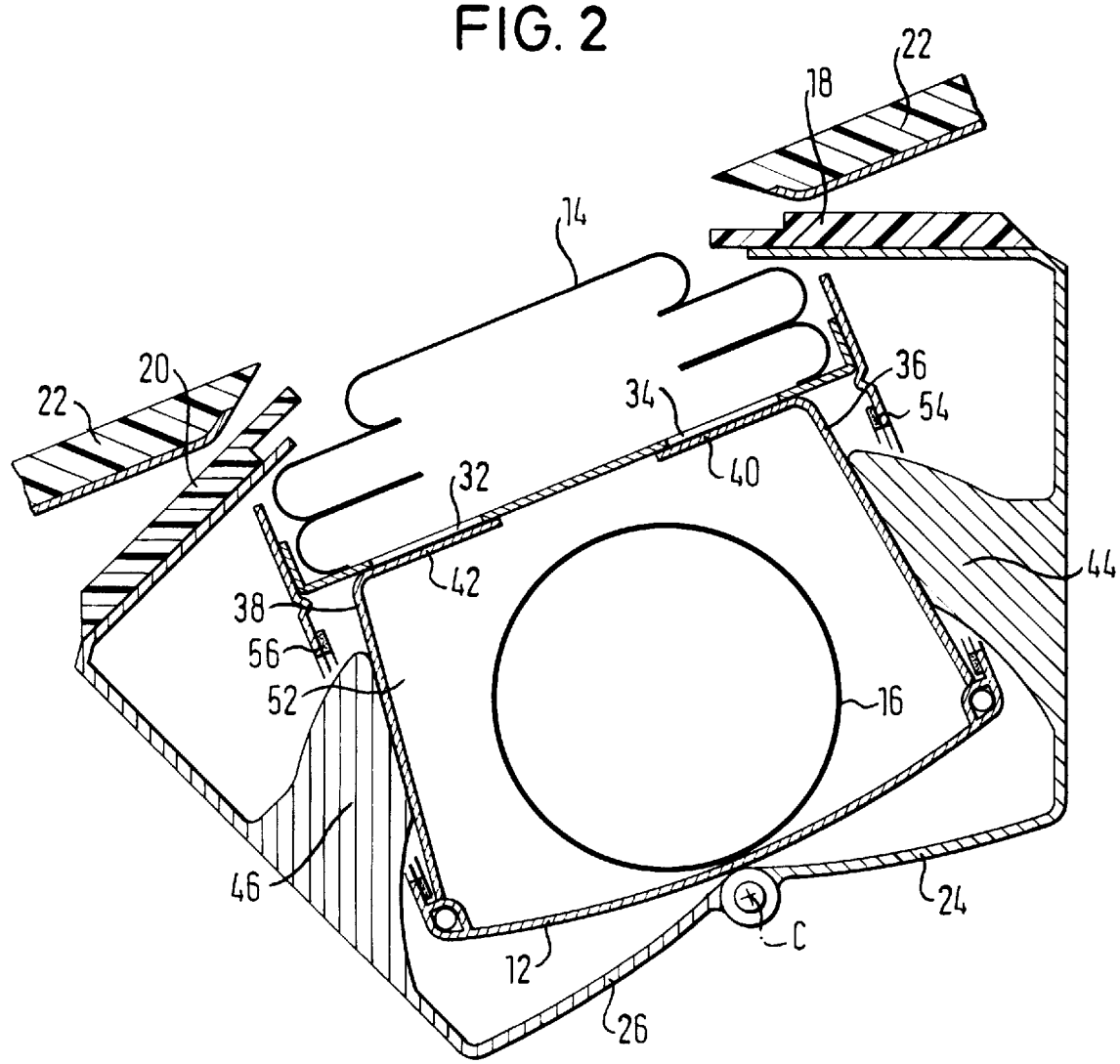
FIG. 2 shows in a cross-sectional view the gas bag module of FIG. 1 in a state after activation of the gas generator and before the unfolding of the gas bag.

If the gas generator 16 is activated, starting from the state of rest, firstly the working chamber 52 formed by the base of the housing 12, the slider plates 36, 38 and the slider elements 40, 42, is set under pressure. An inflow of the already provided compressed gas into the gas bag 14 is not possible in this state. The pressure occurring in the working chamber 52 causes each of the slider plates 36, 38 to be swivelled outwards towards the side wall of the housing. In so doing, the slider elements 40, 42 slide in a tight manner on each other and on the dividing wall 30, so that the working chamber 52 remains closed. In FIG. 2, such a state is shown with outwardly swivelled slider plates 36, 38, which in this state extend parallel to the side walls of the housing and therefore ensure an optimum conversion of the pressure prevailing in the working chamber 52 into an opening force for the cover. The slider elements 40, 42 lie against the dividing wall 30 in the region of the passage openings 32, 34. On their swivelling movement outwards, the slider plates 36, 38 press the support elements 44, 46 outwards, the latter entraining the swivel plates 24, 26 and hence the components 18, 24 of the cover. Owing to the arrangement of the swivel axis C in the region of the base of the housing 12, the components 18, 20 of the cover can dip away under the instrument panel. A risk for a vehicle occupant to get hit by the cover therefore no longer exists. It is pointed out in particular that in the state of the gas bag module, as shown in FIG. 2, the cover 18, 20 is completely opened, before the gas bag 14 is acted upon by compressed gas.

Figure 3:
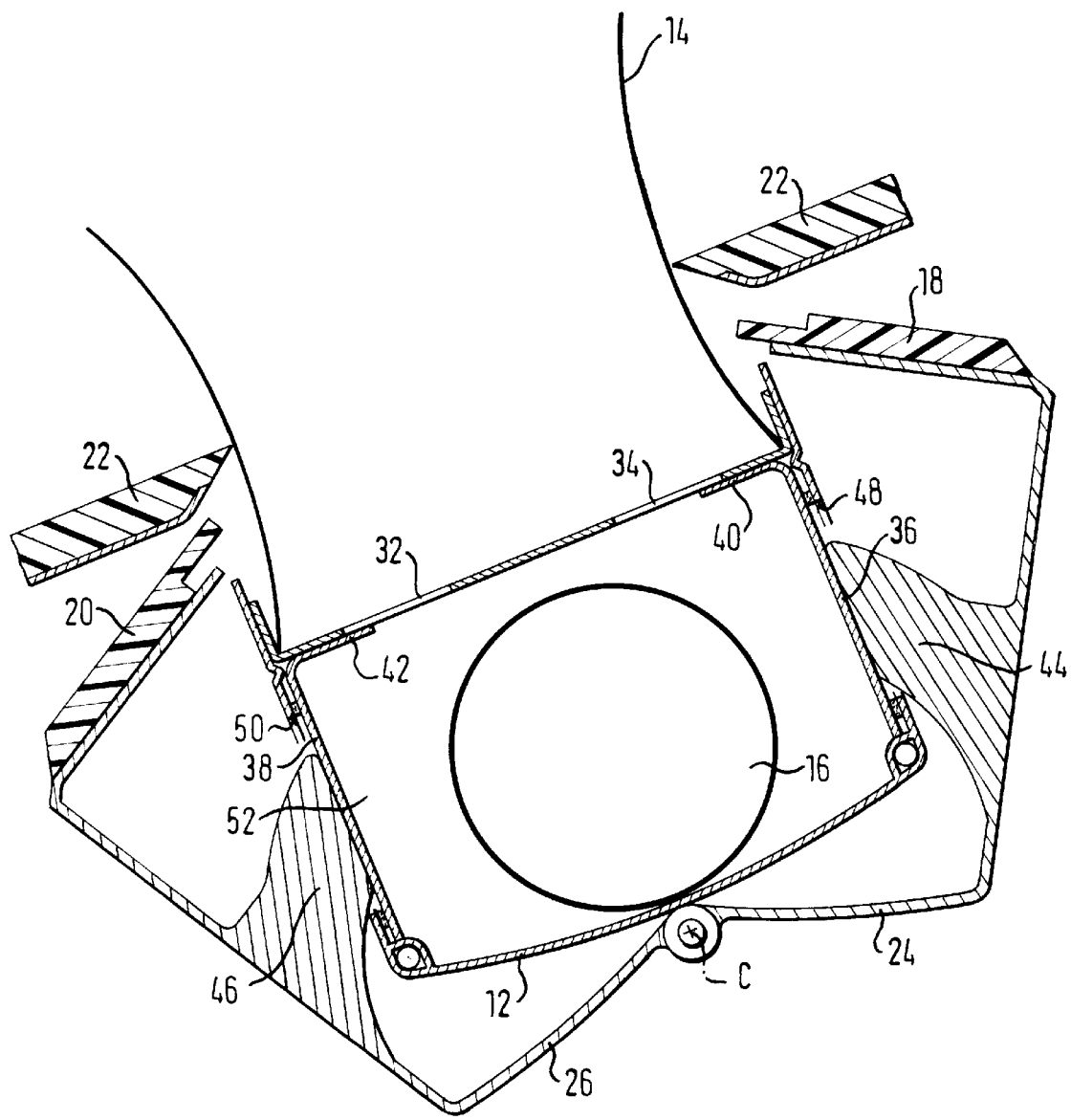
FIG. 3 shows the gas bag module of FIG. 1 in the state with unfolded gas bag.
Figure 4:
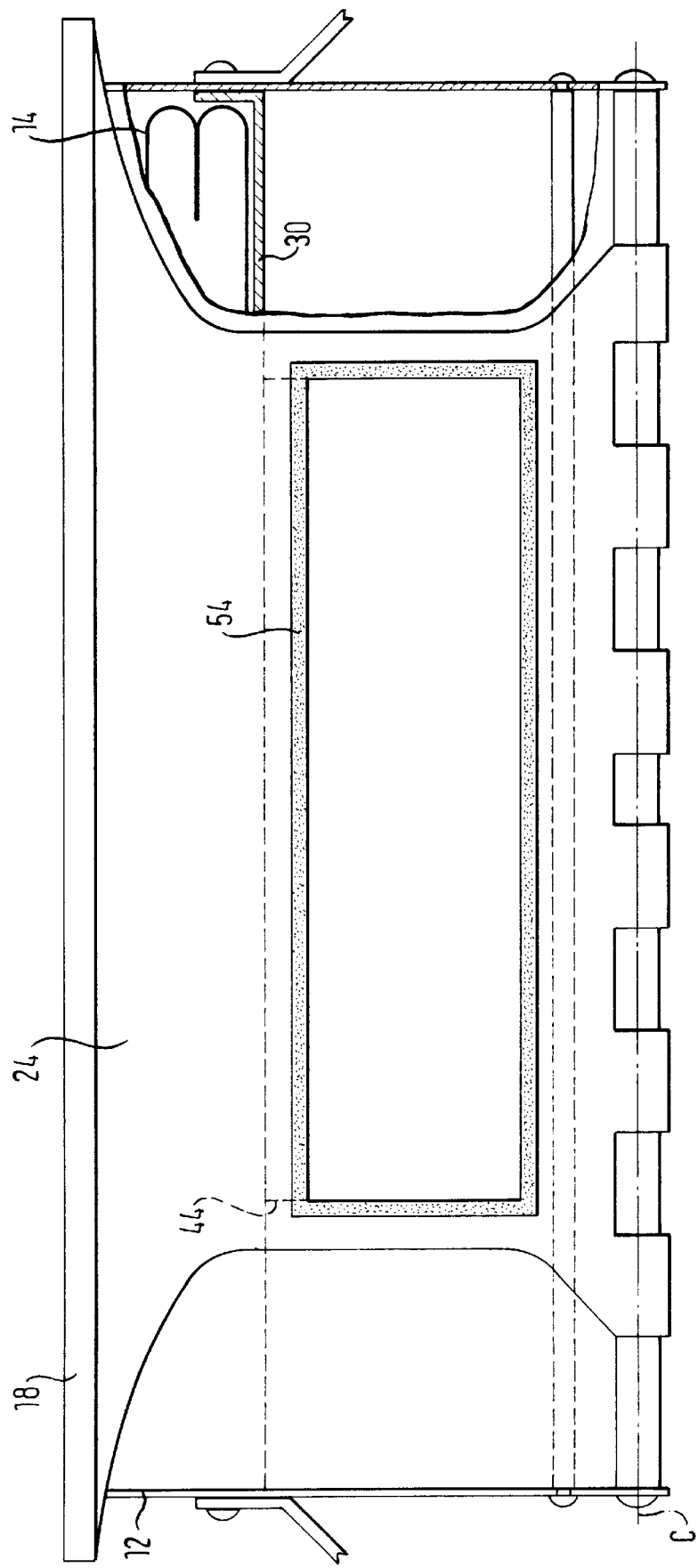
FIG. 4 shows in a partially sectioned side view the gas bag module of FIG. 1.

In FIG. 3 the state of the gas bag module of FIG. 2 is shown, after the slider plates 36, 38 have been swivelled completely to the side walls of the housing 10 under the action of the pressure produced in the working chamber 52. In this position, the slider elements 40, 42 have exposed the passage openings 32, 34 so that the compressed gas produced by the gas generator 16 can flow out from the working chamber 52 into the gas bag 14 and unfold it. For a better sealing of the working chamber 52, seals 54, 56 are provided along the periphery of each opening 48, 50 in the side wall of the housing 12 (See also FIG. 4).

The support element 44, 46 can either be formed in one piece with the corresponding swivel plate 24, 26, for example as an integral projection in the case of a swivel plate of plastic, or as a bend projection in the case of a swivel plate of metal, or can be formed as a separate part and fastened to the swivel plate.

Figure 5:
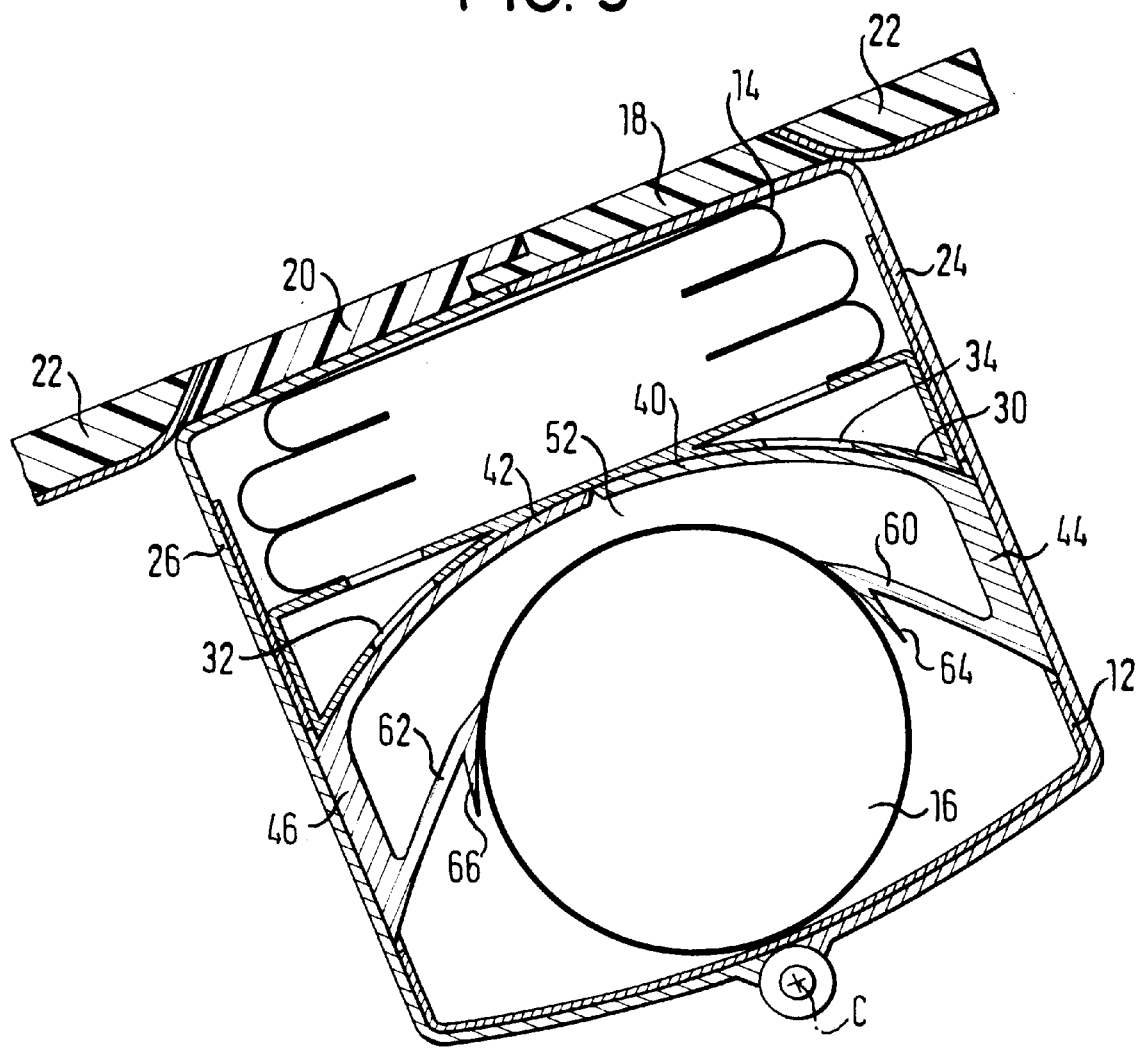
FIGS. 5 to 7 show in a cross-sectional view a gas bag module according to the invention in accordance with a second embodiment in the state of rest, after the activation of the gas generator and with unfolded gas bag, respectively.
Figure 6:
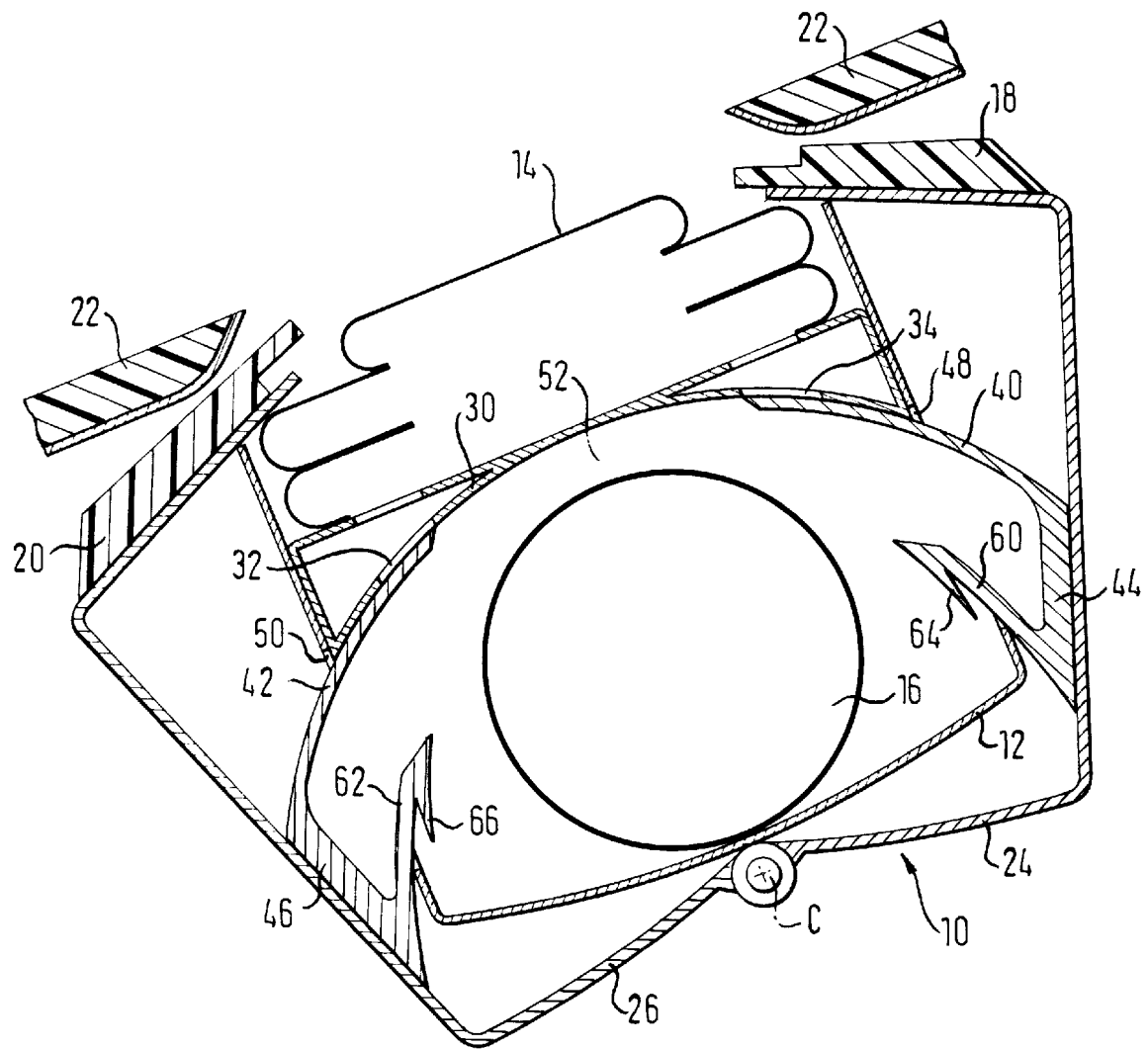
Figure 7:
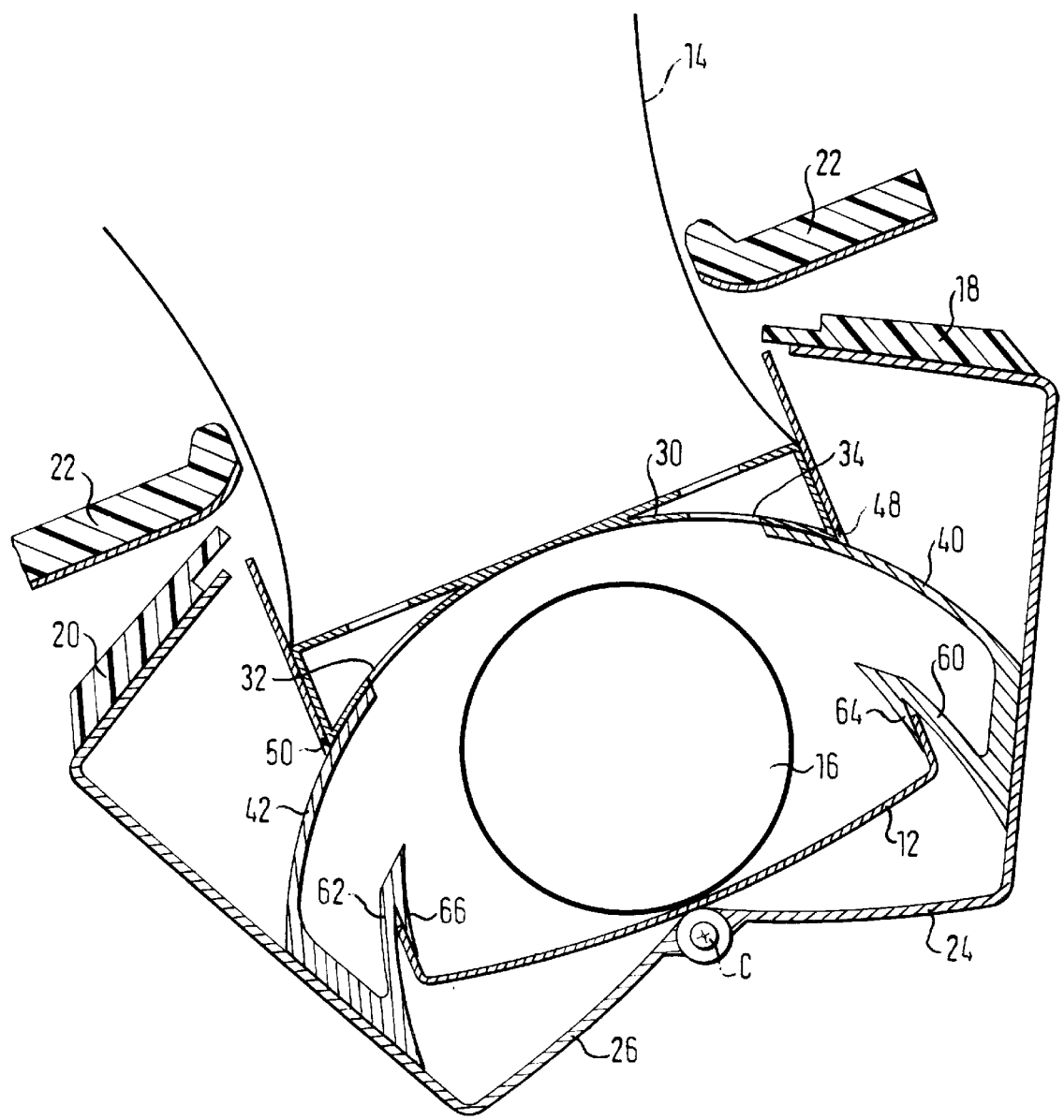

In FIGS. 5 to 7, a second embodiment is shown of the gas bag module according to the invention. As the structure and the mode of operation of the gas bag module according to the second embodiment largely correspond to those of the first embodiment, only the differences between the two embodiments are entered into hereinbelow. Structural elements of the second embodiment which correspond to structural elements of the first embodiment having the same function are designated by the same reference numbers.

The dividing wall 30 in the second embodiment is constructed so as to be curved, the center of curvature coinciding approximately with the swivel axis C. In addition, the slider elements 40, 42 are constructed so as to be curved in the same manner, so that an overall contact results between the slider elements and the dividing wall. In addition, a sealing element 60, 62 is provided on each support element 40, 42, which sealing element 60, 62 in the state of rest lies against the outer wall of the gas generator 16 and together with the support elements 44, 46 and the slider elements 40, 42 forms the working chamber 52. In the region of its end lying against the gas generator 16, each sealing element 60, 62 is provided with a stop 64, 66 which is provided to limit the swiveling of the swivel plates 24, 26.

After activation of the gas generator, firstly the working chamber 52 is acted upon by the compressed gas provided by the gas generator 16. As the slider elements 40, 42 close the passage openings 32, 34 in the dividing wall 30, the pressure prevailing in the chamber 52 urges the support elements 44, 46 outwards, whereby the cover 18, 20 is opened.

In FIG. 6 the gas bag module 10 is shown in the state in which the slider elements 40, 42 still close the passage openings 32, 34 in the dividing wall 30. The cover 18, 20 is already completely open, without the gas bag 14 being acted upon by compressed gas. The sealing elements 60, 62 close the working chamber 52 in a tight manner by abutting against the openings 48, 50.

In FIG. 7, the gas bag module 10 is shown in the state with the swivel plates 24, 26 swiveled completely outwards and with the gas bag 14 unfolded. The stops 64, 66 of the sealing elements 60, 62 engage the lower edge of each opening 48, 50 and therefore limit the swivelability in the outward direction. The working chamber 52, in every position of the swivel plates 24, 26, is sealed by the abutting of the sealing elements 60, 62 against the lower edge of the openings 48, 50 and also the abutting of the slider elements 40, 42 against the dividing wall 30, so that no pressure loss towards the outside can occur.

Figure 8:
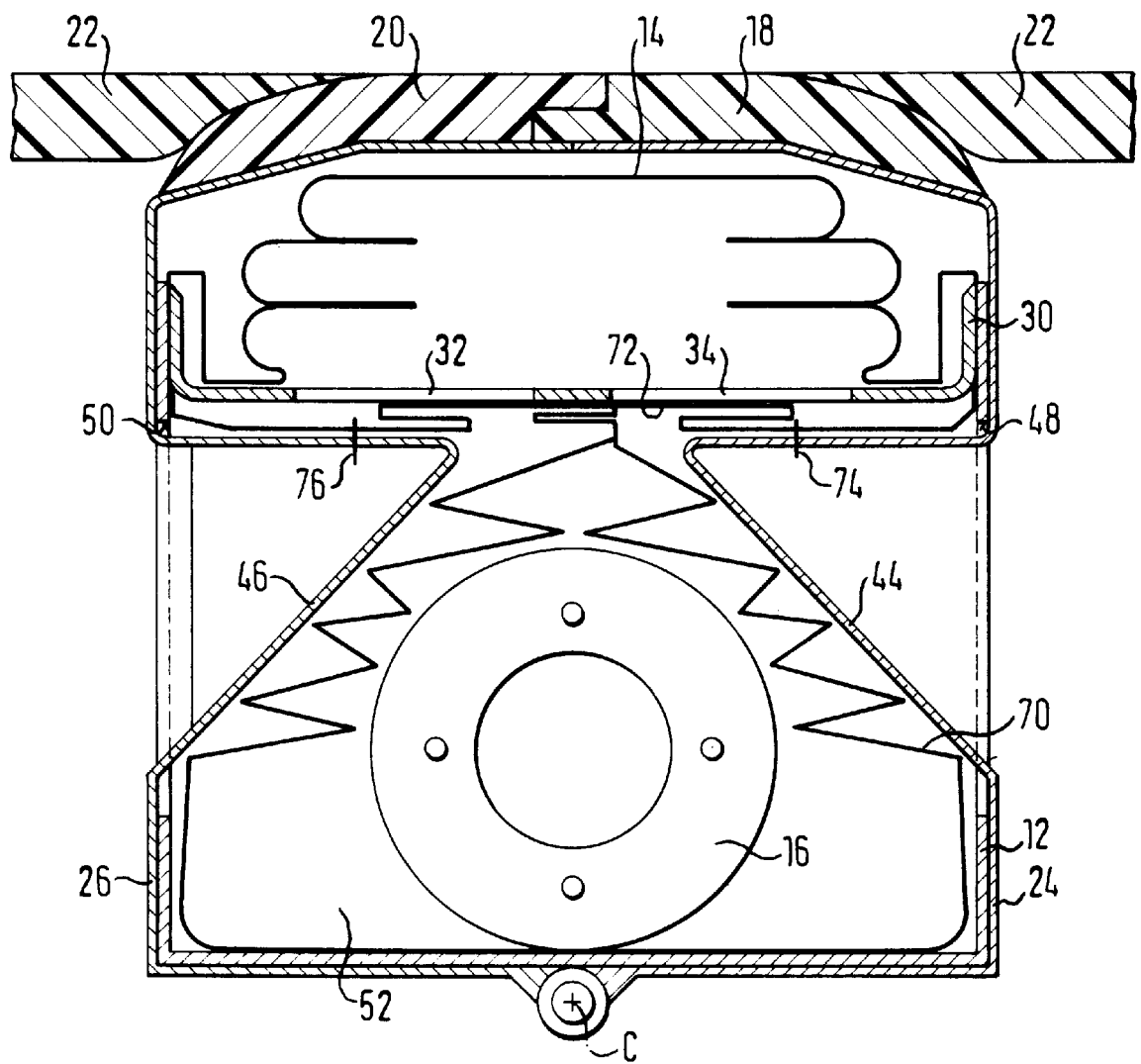
FIGS. 8 to 10 show in a cross-sectional view a gas bag module according to the invention in accordance with a third embodiment in the state of rest, after the activation of the gas generator and with unfolded gas bag, respectively.

In FIG. 8 a gas bag module according to the invention is shown in accordance with a third embodiment. Here, also, only the differences from the first embodiment of the gas bag module are described, and the reference numbers which are used correspond to those known from the preceding figures.

In the third embodiment, the working chamber 52 is formed by a first and second fabric flap 70, 72 which are arranged around the gas generator 16. The first fabric flap 70, starting from the dividing wall 30, extends along the swivel plate 24, over the support element 44 formed thereon, along the base of the housing 12 and finally along the support element 46 and the swivel plate 26 to the dividing wall 30 again. The second fabric flap 72 extends between two fixing points 74, 76 on the swivel plates 24, 26. The first fabric flap 70 can be constructed in one piece with the gas bag 14, the dividing wall 30 then having to be arranged in its interior and connected with the housing 12. The first and the second fabric flaps 70, 72 together form a control gas bag, in the interior of which the gas generator 16 is arranged.

The support elements in this embodiment have a region against which the fabric flap 70 rests directly, when it is acted upon by compressed gas. This region is formed by the section of each support element 44, 46 extending from the side wall of the housing obliquely upwards and towards the center of the housing.

After activation of the gas generator 16, the working chamber 52 formed by the first and the second fabric flaps 70, 72 is acted upon by compressed gas. In so doing, the first fabric flap 70 rests against the support elements 44, 46 and attempts to press these out of the housing. Through the oblique course of the region against which the fabric flap 70 rests against each support element, a type of wedge effect is produced of the fabric piece 70, moving towards the cover, on the support elements, which effect assists the opening process of the cover. On swiveling of the swivel plates 24, 26, the components 18, 20 of the cover are swiveled under the instrument panel 22.

Figure 9:
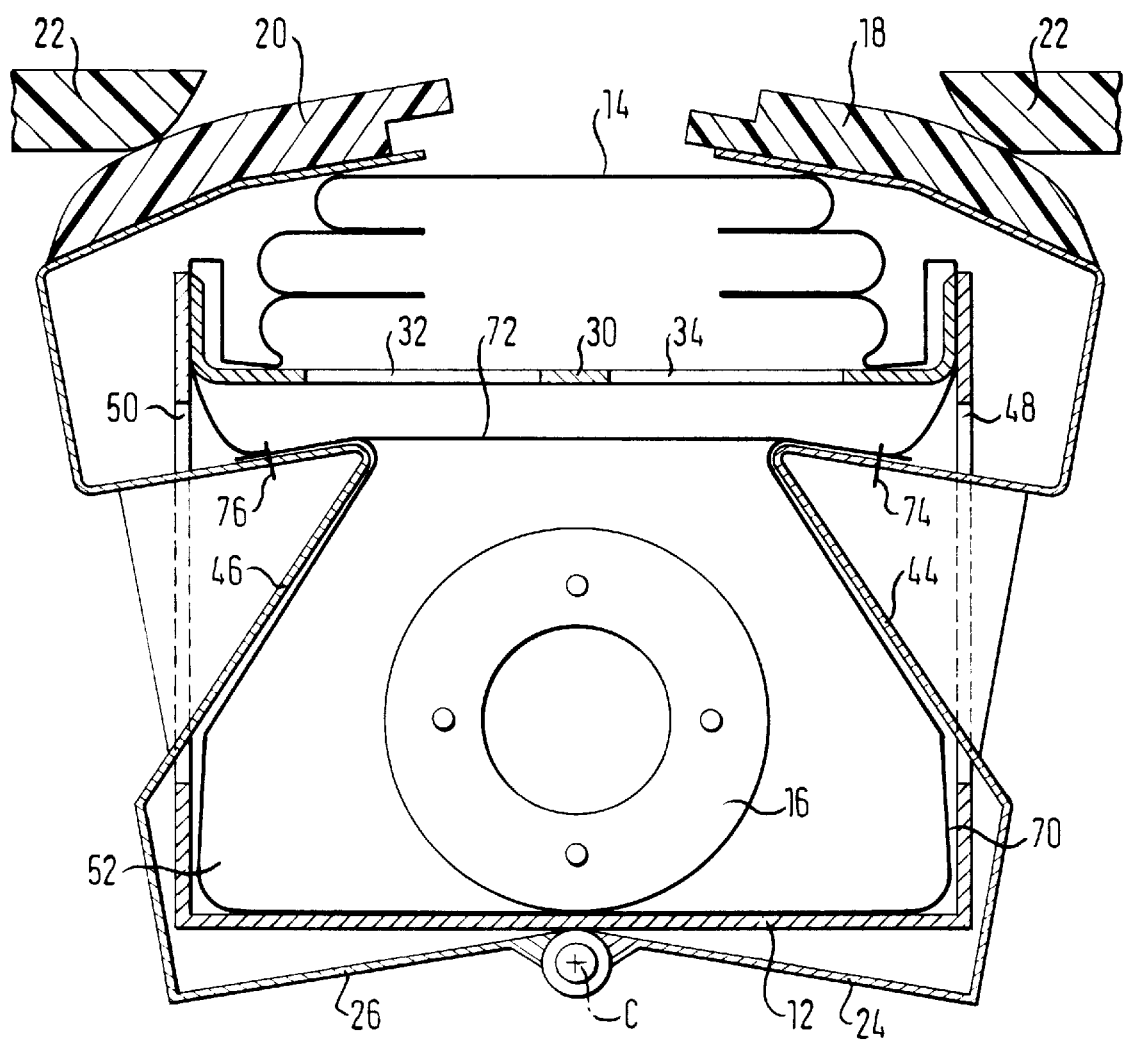

As can be seen in FIG. 9, on swiveling of the swivel plates 24, 26 outwards, the second fabric piece 72 is tensioned, until it finally extends approximately in a straight line between the two fixing points 74, 76. In this state, the cover 18, 20 is already almost completely opened, without the gas bag 14 being acted upon by compressed gas, because the second fabric flap 72 does not allow an inflow of the compressed gas provided by the gas generator 16, through the passage openings 32, 34 into the gas bag 14. The working chamber 52 in this state is sealed off, by means of the first fabric flap 70, with respect to the openings 48, 50 in the side walls of the housing 12.

Figure 10:
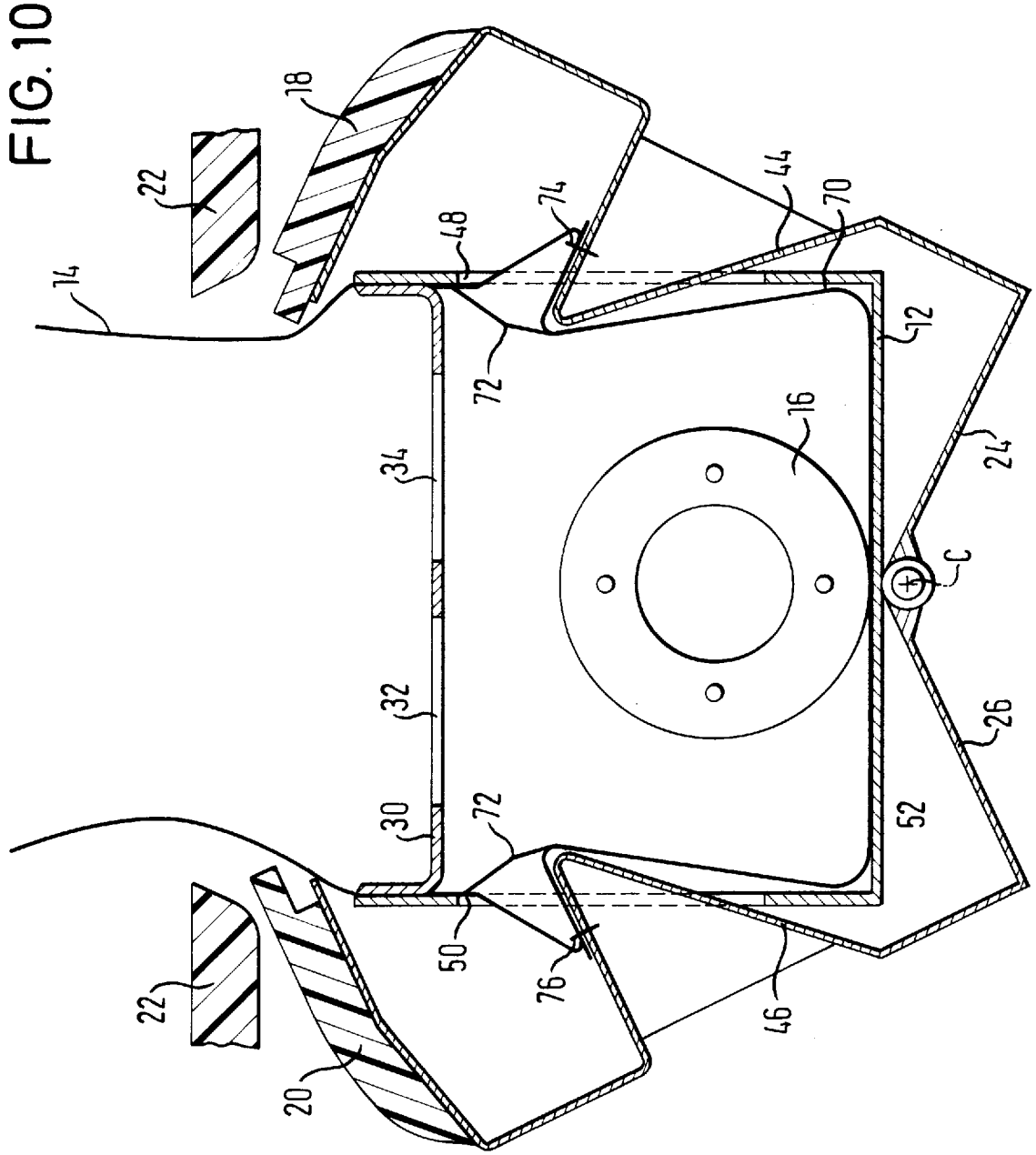

In FIG. 10, the gas bag module is shown with fully opened cover 18, 20 and unfolded gas bag 14. The second fabric piece 72 is torn under the action of the ever increasing pressure in the working chamber 52, so that the swivel plates 24, 26, driven by the pressure inside the working chamber 52, acting on their support elements 44, 46, were swiveled outwards. In this state, the openings 48, 50 in the side walls of the housing 12 are sealed by means of the first fabric flap 70, which extends in the upper region of the openings, starting from the connection between the dividing wall 30 and the side walls of the housing to the fixing points 74, 76 of the swivel plates 24, 26. An outflow of the compressed gas, provided by the gas generator, from the housing 12 through the openings 48, 50 is prevented in this way.

Figure 11:
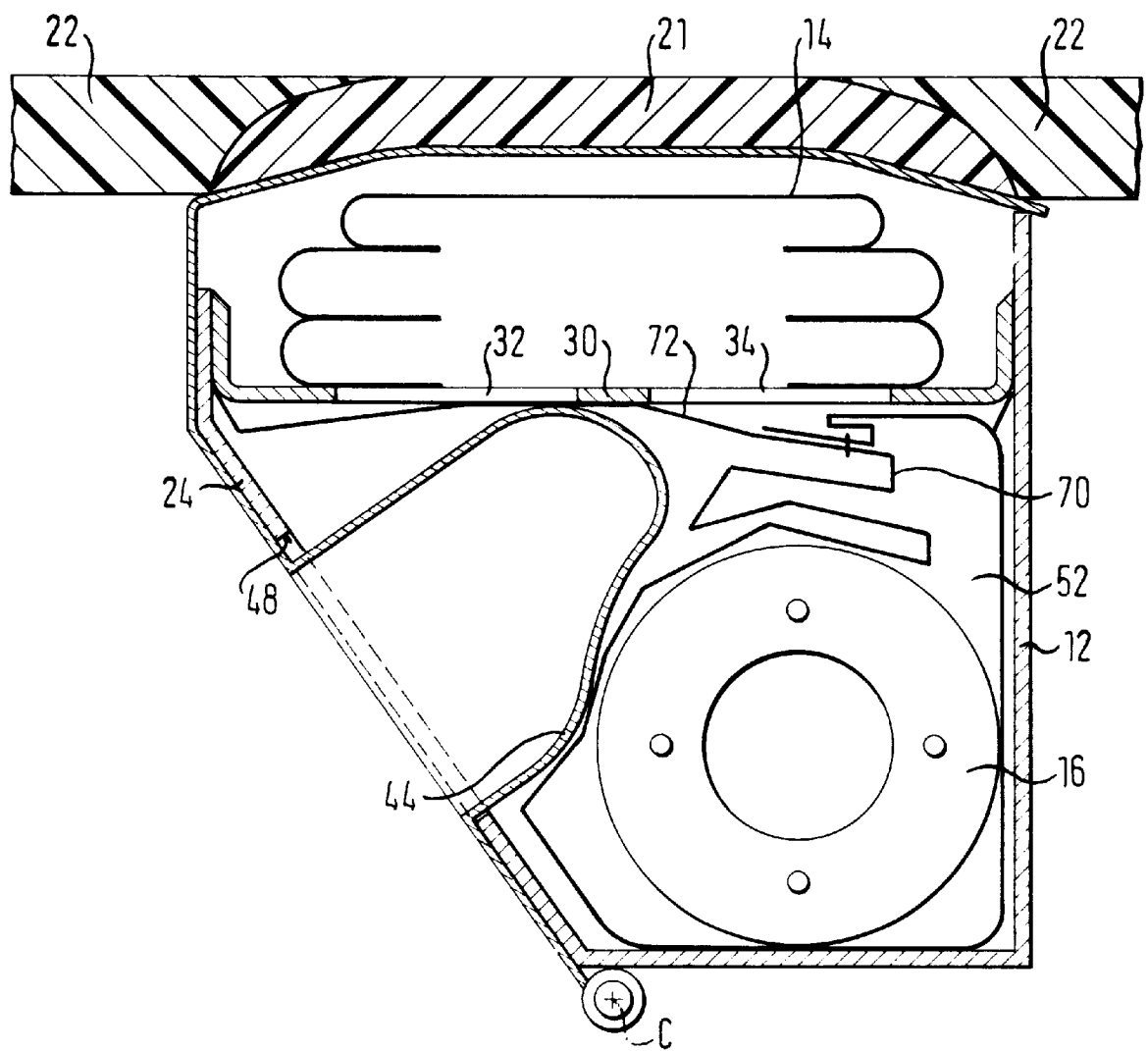
FIGS. 11 to 13 show in a cross-sectional view a gas bag module according to the invention in accordance with a fourth embodiment in the state of rest, after the activation of the gas generator and with unfolded gas bag, respectively.

In FIG. 11, a fourth embodiment is shown of a gas bag module according to the invention. In this embodiment, also, only the differences from the previously described embodiments are explained. The various structural elements, in so far as they are known from the preceding drawings, are designated by the same reference numbers.

The gas bag module according to the fourth embodiment is provided with a cover 21 formed in one piece. For its swivelable mounting on the housing 12, only a single swivel plate 24 is used. This is swivelable about a swivel axis C which is arranged in the central longitudinal plane of the housing 12 in the region of the base. The gas generator 16 is arranged on the right-hand side of the housing with respect to FIG. 11, and the support element 44, constructed on the swivel plate 24 and projecting through the opening 48 into the interior of the housing, has on its face facing the gas generator 16 a contour adapted thereto, the support element 44 also in this embodiment extending obliquely inside the housing and in such a way that a wedging effect is produced with the fabric flap 70 moving towards the gas bag 14. Inside the housing, a first and a second fabric flap 70, 72 are provided, which together form a working chamber 52. After activation of the gas generator, this working chamber is acted upon by compressed gas and the swivel plate 24 is swiveled outwards owing to the pressure acting on the support element 44. In so doing, the cover 21 dips away under the instrument panel 22.

Figure 12:
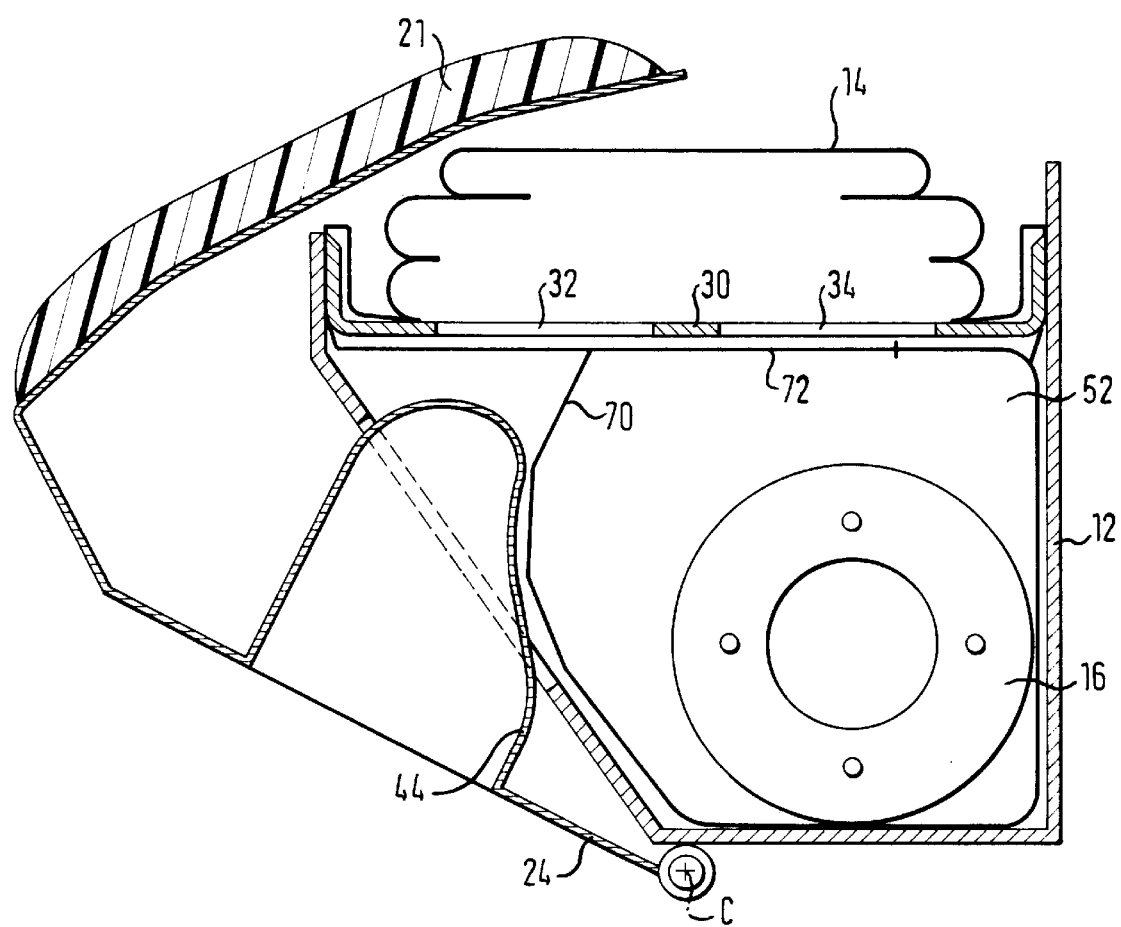
Figure 13:
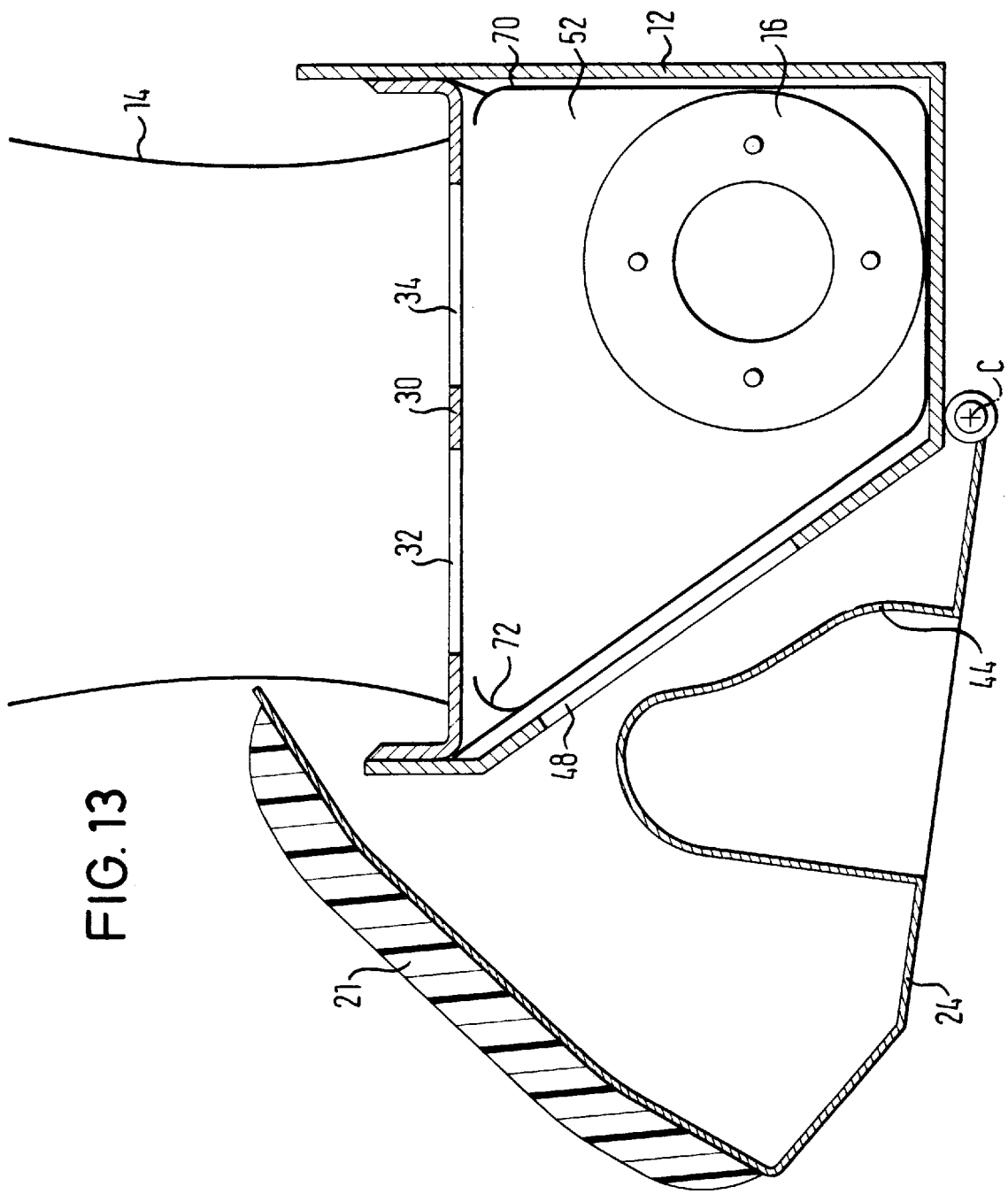

In FIG. 12 the gas module is shown in a state in which the cover 21 is almost fully opened. In this state, the working chamber 52 formed by the first and the second fabric piece 70, 72 is still closed, so that the compressed gas provided by the gas generator 16 can not flow through the passage openings 32, 34 into the gas bag 14 and unfold it.

If a predetermined pressure is exceeded inside the working chamber 52, the second fabric piece 72 is torn and the compressed gas can flow through the passage openings 32, 34 into the gas bag 14 and unfold it. The first fabric piece 70 seals the opening 48 in the side wall of the housing 12, so that the compressed gas which is produced is fully available to fill the gas bag 14.

Figure 14:
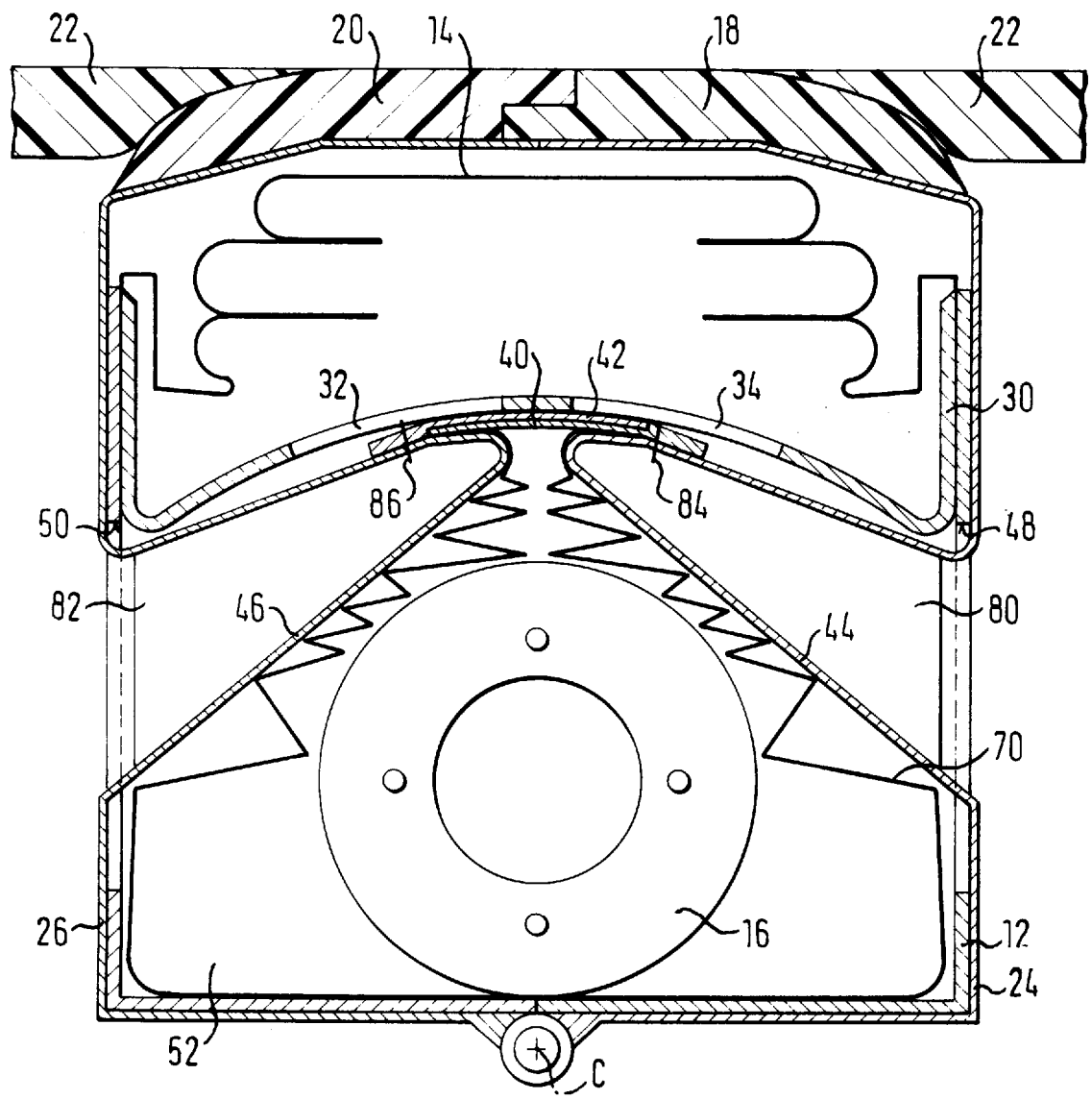
FIGS. 14 to 16 show in a cross-sectional view a gas bag module according to the invention in accordance with a fifth embodiment in the state of rest, after the activation of the gas generator and with unfolded gas bag, respectively.

In FIG. 14, a fifth embodiment is shown of a gas bag module according to the invention. In this embodiment also only the differences from the previously described embodiments are explained. The various structural elements, in so far as they are known from the preceding drawings, are designated by the same reference numbers.

The gas bag module according to the fifth embodiment is provided with a fabric flap 70 which serves for sealing at the openings 48, 50, through which the support elements 44, 46 extend into the interior of the housing. As in the third embodiment, the support elements 44, 46 are provided with a support region for the fabric flap 70, extending obliquely from the side walls of the housing 12 in the direction towards the gas bag 14 and towards the central plane of the housing. Reinforcement parts 80, 82 are provided to reinforce the swivel plates 24, 26.

Slider elements 40, 42, constructed in a curved shape, are provided on the support elements 44, 46, which slider elements 40, 42 are known from the gas bag module according to the second embodiment. These cooperate with the dividing wall 30, which is likewise constructed in a curved shape. The slider elements 40, 42 are secured on the upper face of the support elements 44, 46 of the swivel plates 24, 26 by means of a connection point 84 and 86, respectively. At this connection point, also the fabric flap 70 is secured to the swivel plates 24, 26. The connection points can be formed by rivets, screws, welding points, etc. in any desired manner suited to the stresses which occur and to the materials used. The slider element 42 lies in the state of rest directly against the dividing wall 30, whereas the slider element 40 lies against the slider element 42 on its face facing away from the dividing wall.

Figure 15:
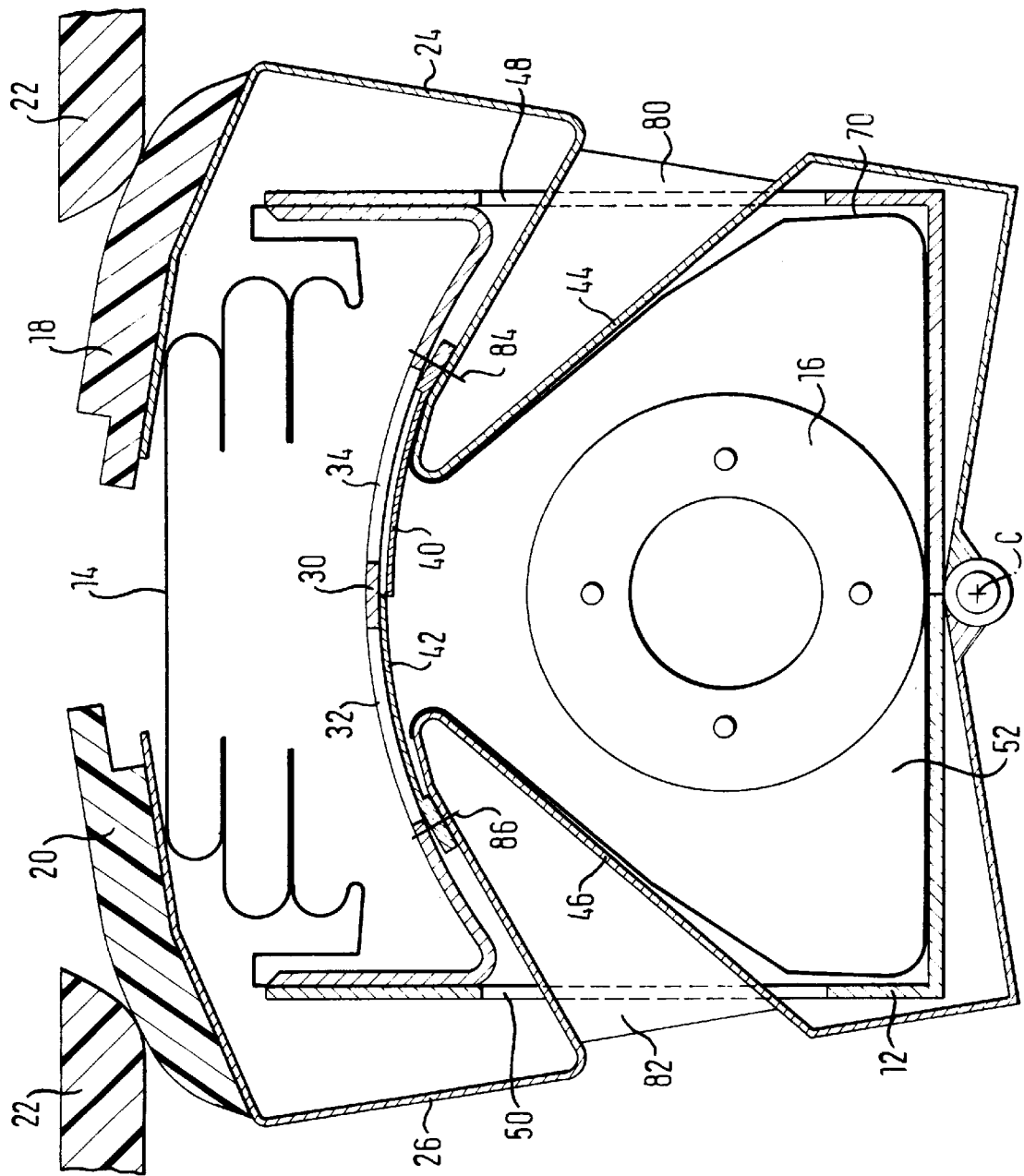
Figure 16:
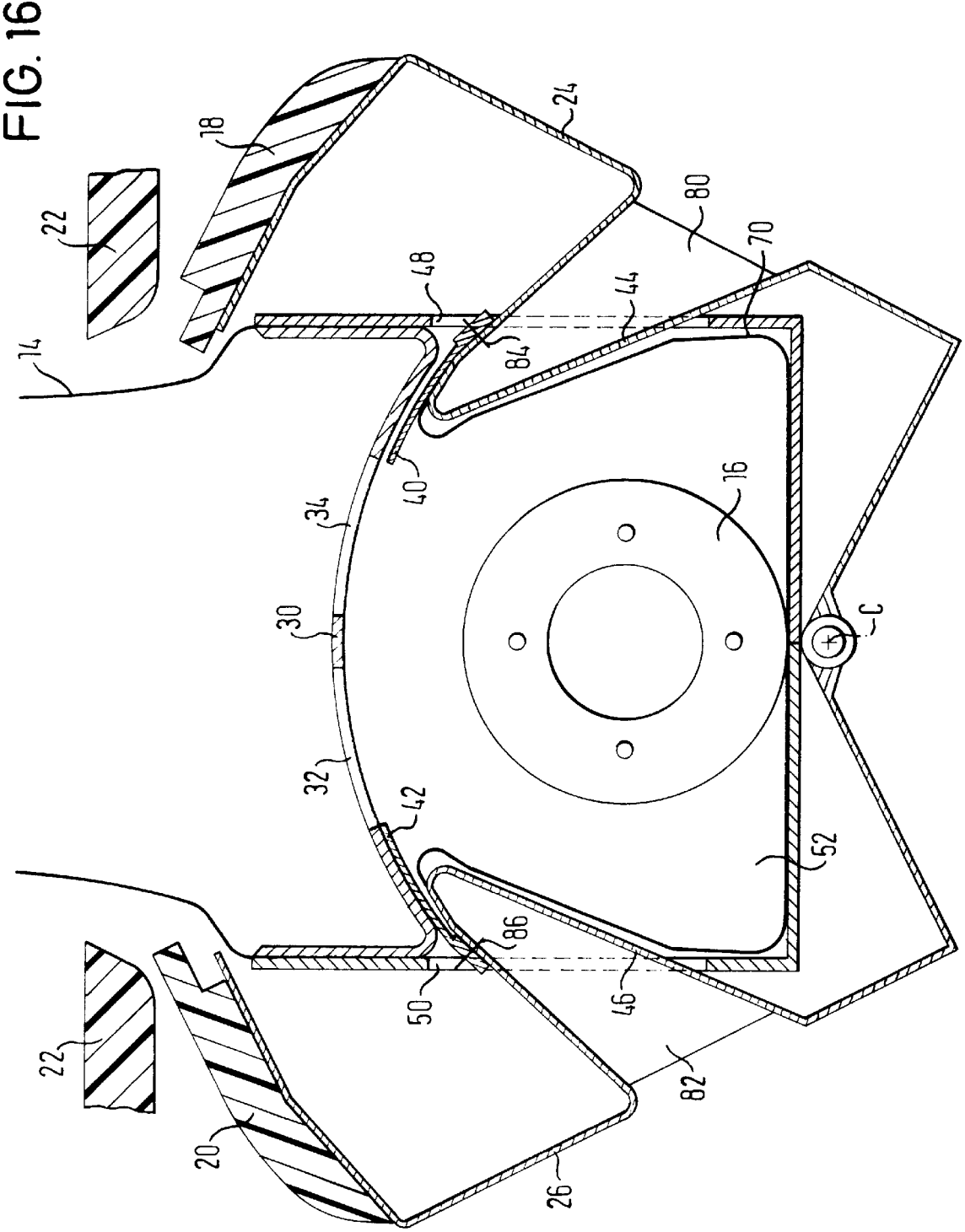
Figure 17:
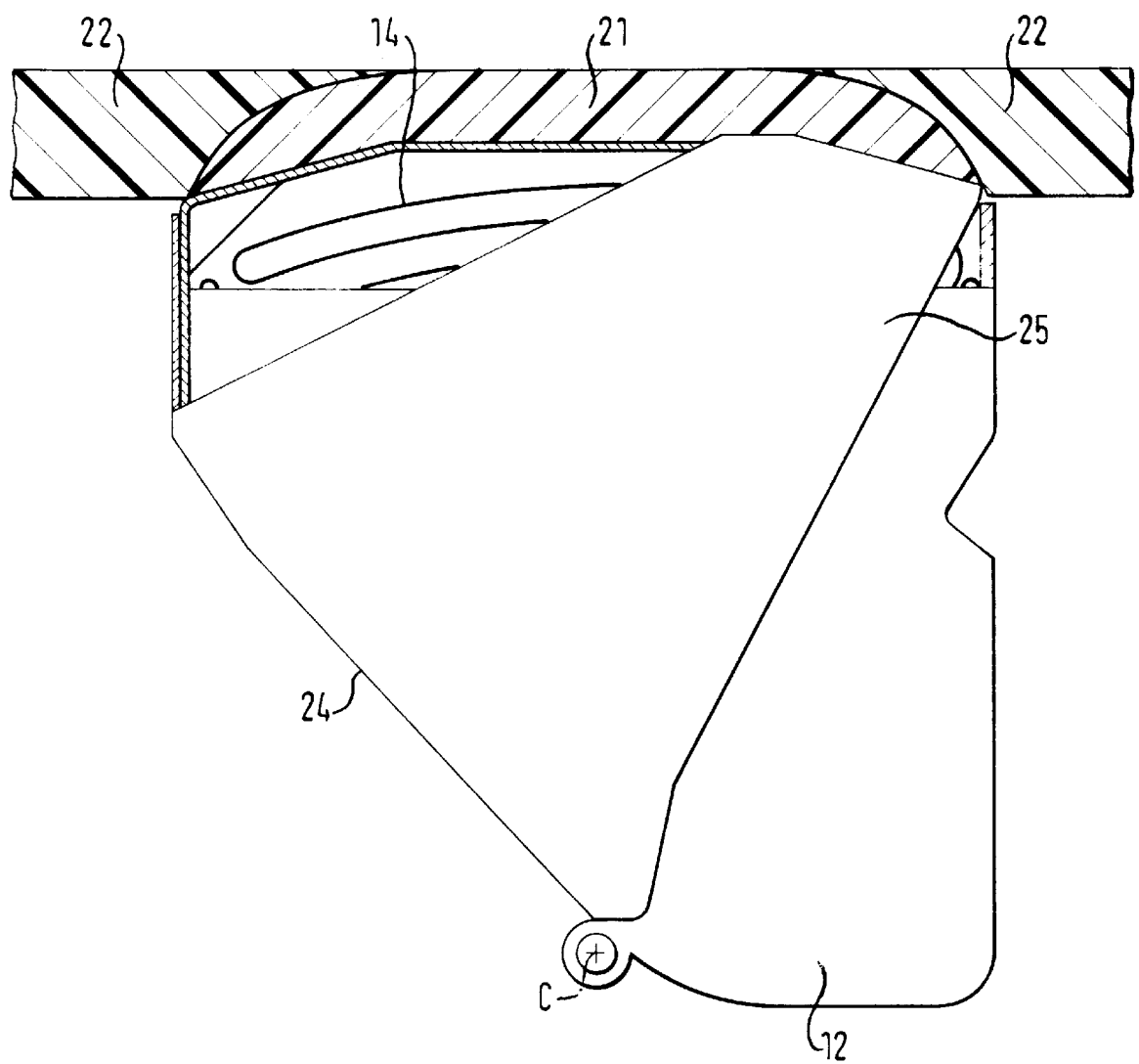
FIGS. 17 to 20 show in a side view and a cross-sectional view a gas bag module according to the invention in accordance with a sixth embodiment in the state of rest, after the activation of the gas generator and with unfolded gas bag, respectively.
Figure 18:
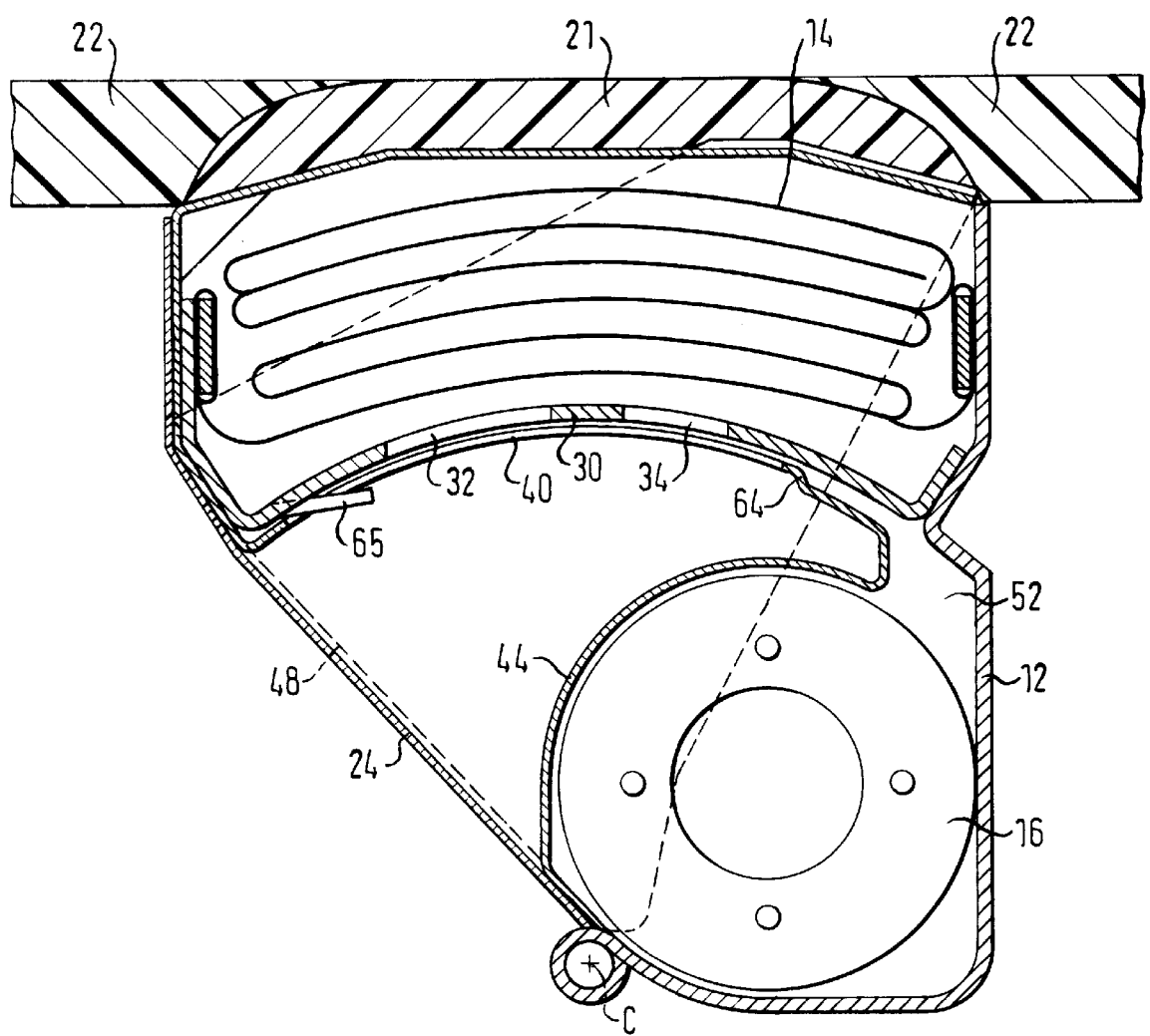
Figure 19:
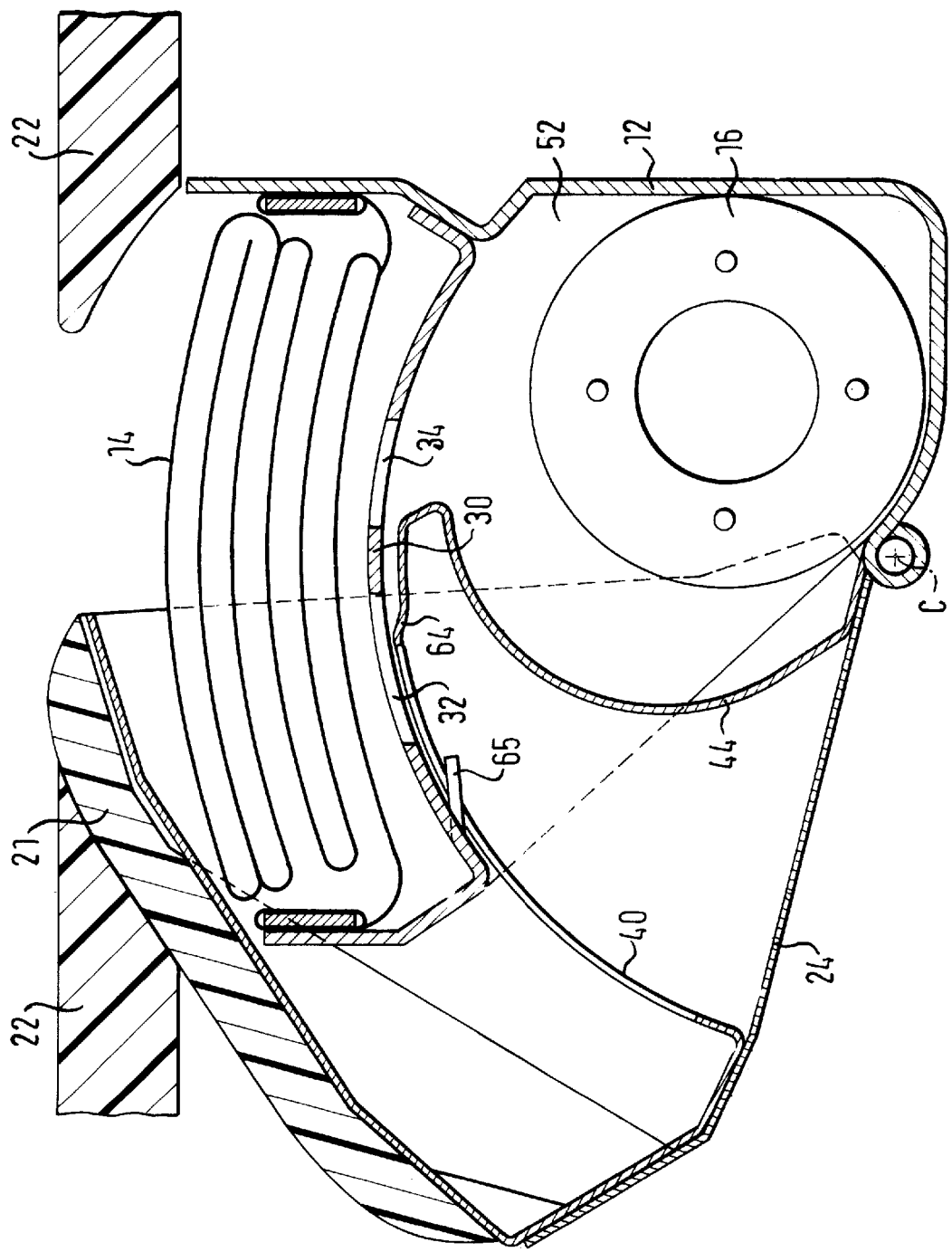

After the activation of the gas generator 16, the compressed gas provided by it flows firstly into the working chamber 52. This is closed off tightly by means of the slider elements 40, 42 so that the gas bag 14 is not initially acted upon by compressed gas. The fabric flap 70 rests against the support pieces 44, 46 and presses them outwards, whereby the components 18, 20 of the cover are opened, until the state is reached which is shown in FIG. 15, in which the front edges of the slider elements 40, 42 just still touch each other. In this state, in which the cover is already opened to a large extent, the gas bag is still not yet acted upon by compressed gas. Only when the swivel plates 24, 26 and, together with these, the components of the cover are swiveled further outwards, do the slider elements 40, 42 expose the passage openings 32, 34 in the dividing wall 30. The gas bag can now be unfolded towards the interior of the vehicle by means of the compressed gas which is provided by the gas generator, without the gas bag being impaired by the cover (see FIG. 16).

A sixth embodiment of the gas bag module is shown in FIGS. 17 to 20. Components known from the previous embodiments are designated with the same reference numerals, and reference is made to the explanations given above concerning these components.

Figure 20:
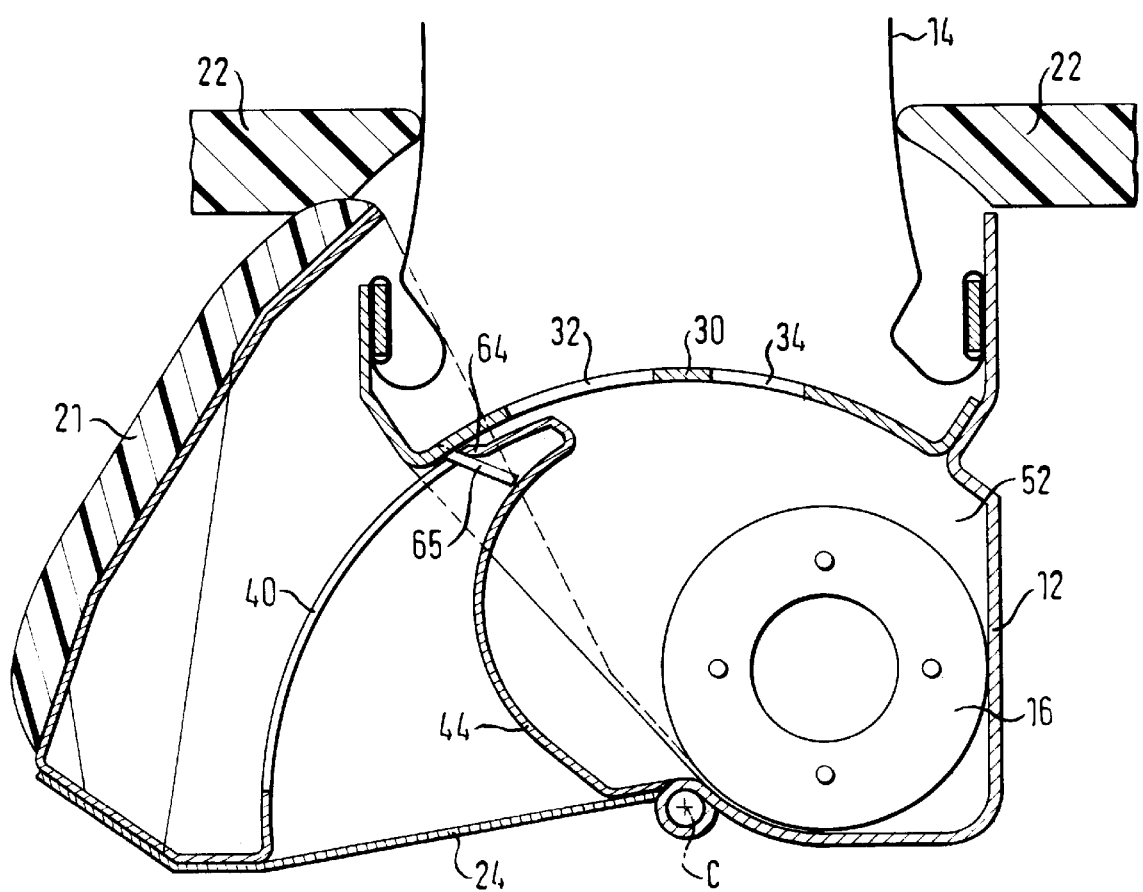

The sixth embodiment is a combination of the second and of the fourth embodiment. A single swivel plate 24 is used, a support element 44 and a slider element 40 being formed at this swivel plate. Further, a cover 21 formed by a single piece is connected to the swivel plate, and a reinforcement part 25 is formed integral with the swivel plate (please refer in particular to the side view shown in FIG. 17). The swivel range of the swivel plate 24 is limited by means of a stop nose 65 which is formed at the housing 12, projects into a slot formed in the support element 44 and can abut at a stop 64 formed at the end of the slot. This is shown in FIG. 20 in which the gas bag module is shown in a condition with the swivel plate 24 pivoted into a completely opened position and with unfolded gas bag 14.

In all the embodiments shown, the support element is arranged in a region of the housing 12 in which a comparatively large amount of space is available. Each of the support elements, when acted upon by compressed gas provided by the gas generator, exerts a force on the respective swivel plate, which force is directed to a great extent approximately parallel to the direction of extent of the cover. In this way, the force is converted optimally into an opening movement of the cover. This is supported, compared with conventional gas bag modules, by the improved leverages on opening of the cover. In conventional gas bag modules, the force exerted onto the cover to open it acts with a comparatively small lever arm on the cover. In the gas bag module according to the invention, a greater lever arm is available.

What is claimed is:

1. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover consists of two components touching each other in said closed position.

2. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover is swivelably mounted on said housing by means of a swivel plate having a swivel axis C extending in a longitudinal direction of said module, and wherein said support element is mounted on said swivel plate.

3. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover is swivelably mounted on said housing by means of a swivel plate having a swivel axis C extending in a longitudinal direction of said module, and wherein two of said swivel plates are provided, each extending along a longitudinal side of said housing.

4. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover is swivelably mounted on said housing by means of a swivel plate having a swivel axis C extending in a longitudinal direction of said module, and wherein said swivel plate is mounted outside said housing and said support element projects into said housing through an opening in a wall of said housing.

5. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein a barrier is provided between said gas generator and said gas bag, said barrier preventing entry of said compressed gas produced by said gas generator into said gas bag immediately after activation of said gas generator.

6. The gas bag module of claim 5, wherein a dividing wall arranged between said gas generator and said gas bag is provided as part of said barrier, said dividing wall having at least one passage opening, said passage opening in an initial state being closed with said cover being closed and in an activated state being exposed with said cover being open.

7. The gas bag module of claim 6, wherein a slider element is provided, said slider element being movable between said initial state in which said passage opening is closed and said activated state in which said passage opening is exposed.

8. The gas bag module of claim 7, wherein said slider element is mounted on a slider plate swivelably mounted in said housing, said support element resting against a face of said slider plate facing away from said gas generator, said slider plate together with said housing forming a working chamber in which said gas generator is mounted.

9. The gas bag module of claim 7, wherein said slider element is mounted on said support element.

10. The gas bag module of claim 7, wherein a sealing element is provided, said sealing element together with said slider element forming a working chamber in which said gas generator is arranged.

11. The gas bag module of claim 10, wherein said sealing element is provided with a stop to limit swiveling of said swivel plate.

12. The gas bag module of claim 10, wherein said sealing element, in a rest position, lies tightly against said gas generator.

13. The gas bag module of claim 10, wherein said slider element, said support element and said sealing element are formed integral with each other and form an essentially U-shaped cross-section, one leg of said U-section being formed by said slider element, another leg being formed by said sealing element and a web being formed by said support element.

14. The gas bag module of claim 7, wherein said slider element exposes said passage opening only when said slider plate has swiveled said support element and hence said swivel plate so far that said cover is at least approximately fully opened.

15. The gas bag module of claim 10, wherein said dividing wall, said slider element and said sealing element are each provided with a curvature, the center of curvature of which coincides at least approximately with said swivel axis so that said slider element and said sealing element provide a sealing effect at said opening in said housing also during the swiveling movement.

16. The gas bag module of claim 6, wherein said passage opening is closed by a bursting membrane.

17. The gas bag module of claim 6, wherein a first fabric piece is provided which is fastened to said housing and seals said opening in said wall of said housing.

18. The gas bag module of claim 17, wherein said first fabric piece extends starting from said gas bag along said side walls and said base of said housing in the interior of said housing.

19. The gas bag module of claim 17, wherein said first fabric piece is formed in one piece with said gas bag.

20. The gas bag module of claim 17, wherein said first fabric piece is fixed to said swivel plate.

21. The gas bag module of claim 17, wherein a second fabric part is used as part of said barrier, said second fabric part being fixed to said swivel plate, forming a closed working chamber together with said first fabric piece, and being torn open after a predefined pressure is exceeded so that said compressed gas produced by said gas generator can flow through said passage opening into said gas bag.

22. The gas bag module of claim 21, wherein said second fabric piece is dimensioned such that a complete opening of said cover is not possible before said fabric piece is torn so that said swivel plate is movable.

23. The gas bag module of claim 5, wherein a control gas bag is formed which surrounds said gas generator and after activation of said gas generator is filled with compressed gas and rests indirectly or directly against said support element.

24. The gas bag module of claim 23, wherein said gas bag is filled with said compressed gas only after said control bag.

25. The gas bag module of claim 22, wherein said control gas bag is provided with a predetermined breaking point which tears after a predetermined internal pressure is exceeded so that said gas bag can be filled.

26. The gas bag module of claim 25, wherein said predetermined breaking point is formed by a tear seam.

27. The gas bag module of claim 25, wherein said predetermined breaking point is formed by a fabric piece.

28. The gas bag module as defined in claim 21, wherein said control gas bag is formed by said first and said second fabric piece.

29. The gas bag module of claim 17, wherein said support element has a region inside said housing against which said fabric piece and said control gas bag rests on pressurization with compressed gas and which, in said state of rest and starting from a side wall of said housing, extends obliquely into the interior of said housing towards said gas bag.

30. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover is swivelably mounted on said housing by means of a swivel plate having a swivel axic C extending in a longitudinal direction of said module, and wherein said housing has a base and said swivel axis is arranged in the region of said base.

31. A gas bag module of a vehicle occupant restraint system, comprising a housing, a gas bag arranged therein, a gas generator for filling said gas bag with compressed gas, and a cover which in a closed position closes said housing and can be brought into an opened position after activation of said gas generator so that said gas bag can emerge from said housing, said cover being coupled to a support element which is spatially separate from said cover, said support element, after activation of said gas generator, being exposed to a force resulting from said compressed gas produced by said gas generator and biasing said cover into said opened position, wherein said cover is swivelably mounted on said housing by means of a swivel plate having a swivel axis C extending in a longitudinal direction of said module, and wherein said swivel axis is arranged in a central longitudinal plane of said housing.

32. The gas bag module of claim 31, wherein said swivel plate has a generally U-shaped cross-section, one leg extending along said base of said housing, a web of said U-section extending along a side wall of said housing and a second leg extending along a face of said housing opposite to said base.

33. The gas bag module of claim 30, wherein said cover is flush with a vehicle paneling, beneath which said module is mounted, and wherein said cover, on opening, dips away under said vehicle paneling.

* * * * *